United States Patent [19]

Herr

[11] 4,077,432
[45] Mar. 7, 1978

[54] PURGED VALVE

[75] Inventor: Leroy E. Herr, Allentown, Pa.

[73] Assignee: Mosser Industries, Inc., Bethlehem, Pa.

[21] Appl. No.: 757,096

[22] Filed: Jan. 5, 1977

[51] Int. Cl.$^2$ .............................................. F16K 1/226
[52] U.S. Cl. .............................. 137/601; 137/246.22; 251/306
[58] Field of Search ................... 137/237, 246, 246.11, 137/246.22, 601; 251/306

[56] References Cited

U.S. PATENT DOCUMENTS

| | | | |
|---|---|---|---|
| 3,532,321 | 10/1970 | Bowman et al. | 251/306 X |
| 3,620,242 | 11/1971 | Pease | 251/306 X |
| 3,749,115 | 7/1973 | Raftis | 137/246.22 |
| 4,003,394 | 1/1977 | Adams | 137/246.22 X |

*Primary Examiner*—Robert G. Nilson
*Attorney, Agent, or Firm*—Sutherland, Asbill & Brennan

[57] ABSTRACT

A valve assembly having a frame with a fluid flow opening therethrough; at least one blade mounted in the frame opening to be movable from a valve open position, in which fluid is able to flow through the frame opening, to a valve closed position, in which fluid is blocked from flowing through said frame opening, said blade having opposing upstream and downstream surfaces, an interior chamber lying between said surfaces, and edge portions joining said surfaces together; a first seat member carried by at least one of said edge portions; a second seat member carried either by an interior wall of the frame or by the edge portion of an adjacent blade; said first and second seat members being so constructed and arranged that when the blade is in the valve closed position the seat members seat against one another to block the flow of fluid around the blade; said first and second seat members being formed such that when the seat members are seated against one another the seat members define an enclosed cavity between the seat members, which cavity extends substantially the entire length of the seat members; and passageway means for carrying fluid under superatmospheric pressure from a source external to said frame, through the interior chamber of said blade, and into the enclosed cavity that is formed by the first and second seat members when the blade is in the valve closed position.

19 Claims, 7 Drawing Figures

PURGED VALVE

This invention relates to a valve assembly having at least one blade movable between a valve open and valve closed position to control fluid flow in a conduit, and more particularly to a purge system for such valves adapted to provide fluidtight isolation of a section of the conduit.

Valve assemblies, such as damper valves, are commonly utilized in power plants and manufacturing plants to control the flow of high velocity gases through a conduit. Routine maintenance and necessary repair work on conduits containing process gases usually require a gastight sealing-off of the portion of the conduit to be repaired or maintained from the portion of the conduit still in operation. Isolation is required to protect the health and safety of the repair workers against toxic or hot gases. Also, sealing of the portion of the conduit under repair is important in preventing disadvantageous dilution of process gases or loss of such valuable gases to the atmosphere outside the conduit.

Various techniques have been employed in the prior art to seal off such conduits in such a way as to permit safe access to the conduit downstream of the seal without having to stop the generation of upstream gases. Some have required a temporary shut-down at that, such as the installation of a plate damper with asbestos rope caulking, or the erection of a masonry wall in the conduit. Another prior art technique, which altogether eliminates the need for a shut-down, is to provide two externally operated dampers in series, spaced a short distance apart, with means to purge the intervening space with air or other harmless gas. The expense of two dampers is an obvious drawback, however.

The valve assembly of the present invention employs a fluid purge system to provide fluidtight isolation of a conduit section, for instance during repair or maintenance. Typically, the purging fluid will be a gas, most often air. In accordance with this invention, the valve assembly for the fluidtight sealing off of the enclosed passageway comprises a frame with a fluid flow opening therethrough. At least one blade is mounted in the frame opening and is movable from a valve open position, in which fluid is able to flow through the frame opening to a valve closed position in which fluid is blocked from flowing through the frame opening. The blade has opposing upstream and downstream surfaces, an interior chamber lying between these surfaces, and edge portions joining the surfaces together. A first seat member is carried by at least one of the edge portions and a second seat member is carried either by an interior wall of the frame or by the edge portion of an adjacent blade. The seat members are so constructed and arranged that when the blade is in the valve closed position the seat members seat against one another to block the flow of fluid around the blade. Moreover, the seat members are formed such that when they are seated against one another they define an enclosed cavity between them that extends substantially the entire length of the seat members. There is also provided a passageway for carrying fluid, e.g. air, under superatmospheric pressure from a source external to the frame, through the interior chamber of the blade, and into the enclosed cavity that is formed by the first and second seat members when the blade is in the valve closed position. When the valve is in the closed position a positive seal can be effected at the blade edge, where leakage is ordinarily a problem, by pumping fluid, ideally air, into the hollow interior of the blade at a pressure that is higher than the pressure against the upstream side of the blade. The pressurized fluid in the blade chamber will pass to the cavity between the first and second seat members and vent from that cavity through any gaps in the seat, caused by imperfections, thereby keeping the upstream fluid away from those gaps and preventing leakage of the upstream fluid through the seat.

For simplicity's sake, the purge fluid will hereinafter be referred to as air, and the upstream fluid as a gas, although it is to be understood that the valve assembly of the present invention can be utilized with other fluids as well.

The air purge system of this invention provides highly effective gastight sealing-off and isolation of a section or sections of a flow control system for safe maintenance and repair work. The system is considerably faster and more efficient than installation and caulking of fluid barriers, and it is less expensive than a series of dampers. The air purge system is formed in the valve assembly as initially installed in the conduit and permits the entire sealing operation to be conducted from outside the conduit.

The air purge system of this invention may be used with various types of movable blade valve assemblies, such as parallel blade louvers, opposed blade louvers, butterfly valves, etc. In a preferred embodiment the air purge system is employed in a rotating damper valve.

Each blade in the valve assembly of the present invention is preferably constructed so that its upstream and downstream surfaces are substantially rectangular, e.g., elongated rectangles. It is also preferred that each blade be rotatable about a longitudinal axis which lies between the upstream and downstream surfaces, substantially perpendicular to the direction of fluid flow through the frame opening. One or more, preferably all, of the blade edge portions carries a seat member which, when closed, forms the aforementioned enclosed cavity. In the preferred embodiment, when the valve is closed the entire inner wall of the frame is lined with one or more air purged cavities, and if the frame houses a plurality of blades, it is preferred that all adjacent edges of adjacent blades meet to form one or more air purged cavities when the valve is closed. On a rectangular blade it is preferred that at least one of the edge portions that is parallel to the axis of rotation carries such a seat member. Each seat member advantageously extends the entire length of the edge portion which carries it.

Preferably, each of the seat members which meet to form an enclosed cavity comprises a substantially flat, rigid surface along its length, and the two rigid surfaces rest face-to-face against each other when the blade is in the valve closed position. Also preferred is that a first seat member which is mounted on an edge portion of a blade also have a leaf spring along its length, spaced apart from, and protruding beyond, the first seat member's flat, rigid surface, and that the seat member cooperating therewith (for example carried on the interior wall of the frame) include a substantially flat seating area along its length, spaced apart from the second seat member's substantially flat rigid surface, the leaf spring and seating area being so constructed and so arranged that when the valve is closed the end of the protruding portion of the leaf spring is urged against the seating area so that the aforementioned enclosed cavity is formed, to wit, is constituted by the space lying between the interface of the two flat, rigid surfaces and the interface between the leaf spring and the seating area.

Preferably the plane of the flat, rigid surfaces when resting against one another is substantially perpendicular to the direction of fluid flow through the opening of the frame.

The passageway means between the blade's internal chamber and the seat member cavity formed when the valve is closed is preferably a plurality of spaced apart gas ports along the edge of the blade's seat member. An advantageous means of connecting the blade's internal chamber to the external source of pressurized fluid is via a passageway inside the shaft of the blade.

The above and other advantages, features and characteristics of the invention are described in further detail in the following detailed description and the accompanying drawings. In the drawings.

Figure 1:
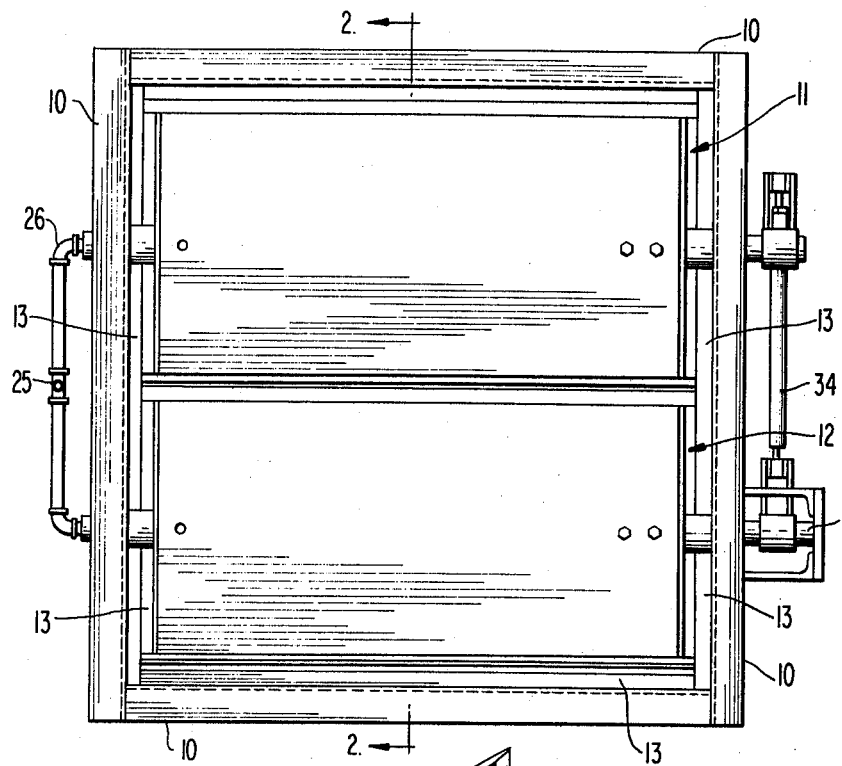
FIG. 1 is a frontal view of a rectangular, two-bladed damper valve assembly of this invention showing the blades in a closed position.

The valve assembly depicted in the attached drawings is comprised of a rectangular channel frame 10 having two louver blades, generally indicated by reference numerals 11 and 12, mounted therein. All four interior walls of frame 10 carry a seat member 13, which has a first flat, rigid surface 14, the plane of which is perpendicular to the direction of fluid flow through the frame opening. Except for their adjacent edge portions, blades 11 and 12 are substantially identical; accordingly, their construction will be described with reference to only one of them, blade 11.

Blade 11 comprises an upstream surface 15 and a downstream surface 16, joined together by four L-shaped (in cross-section) edge portions, three of which, 17, 18, and 19 are clearly visible in the drawings. The fourth edge portion is opposite to, and the same as, edge portion 18. An interior chamber 20 is inside blade 11, bounded by upstream surface 15, downstream surface 16, and edge portions 17, 18, 19, and the fourth (not shown).

Edge portion 17 carries a second flat, rigid surface 21 which rests face-to-face against first flat, rigid surface 14 when blade 11 is in the valve closed position. Edge portion 17 also carries a leaf spring 22 which is spaced apart from, and protrudes beyond, second flat, rigid surface 21.

Figure 2:
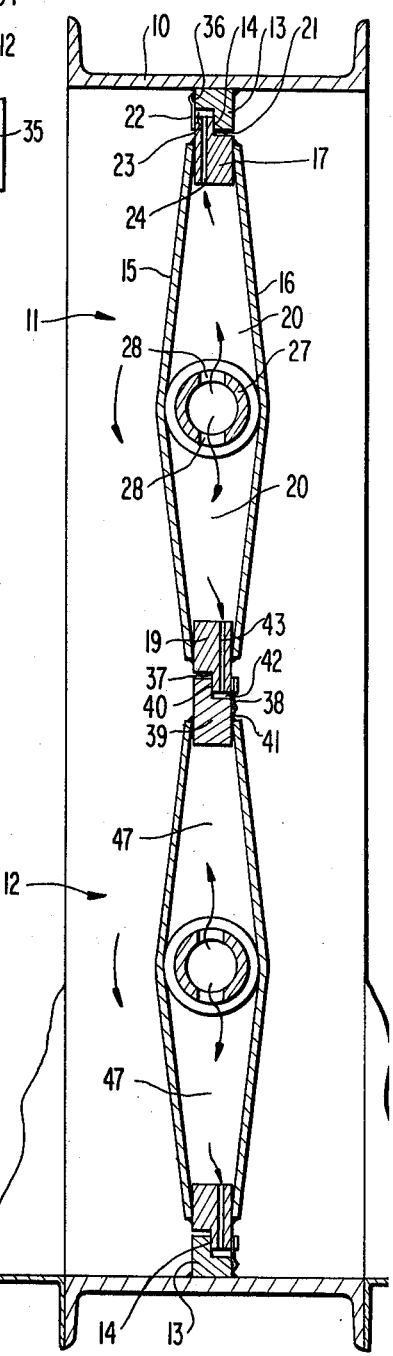
FIG. 2 is an enlarged fragmentary sectional view of portion 2—2 of FIG. 1.
Figure 3:
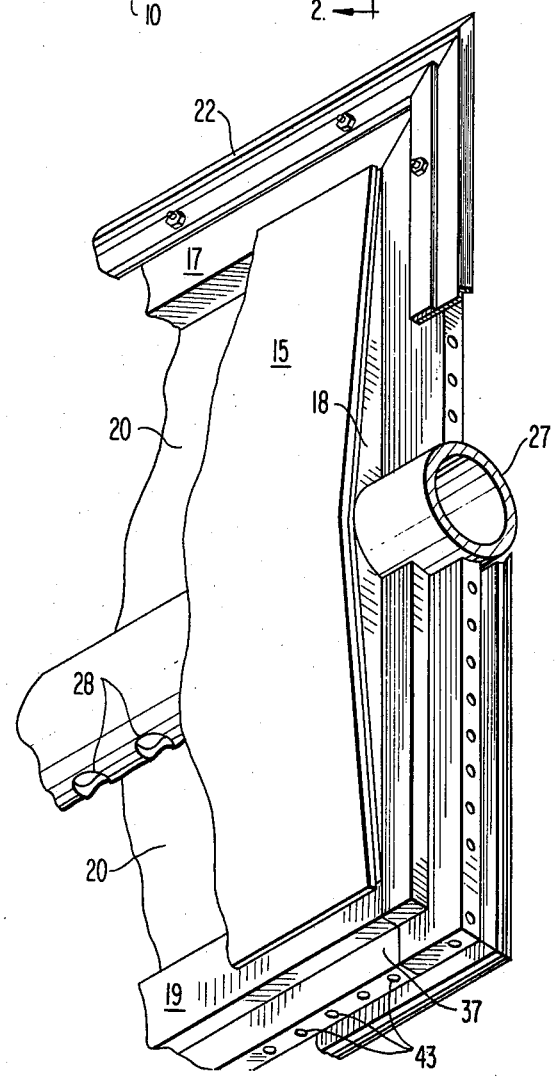
FIG. 3 is an enlarged fragmentary perspective view of the upper blade in FIG. 1.
Figure 4:
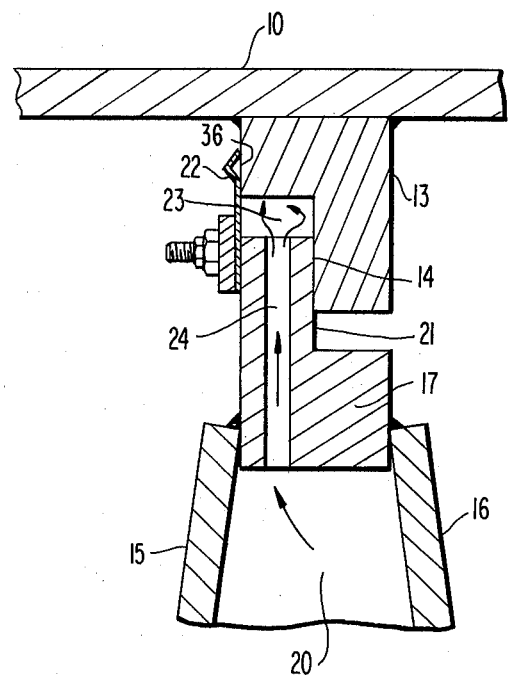
FIG. 4 is an enlarged fragmentary sectional view of the seating arrangement at the top edge of the upper blade depicted in FIG. 1.
Figure 5:
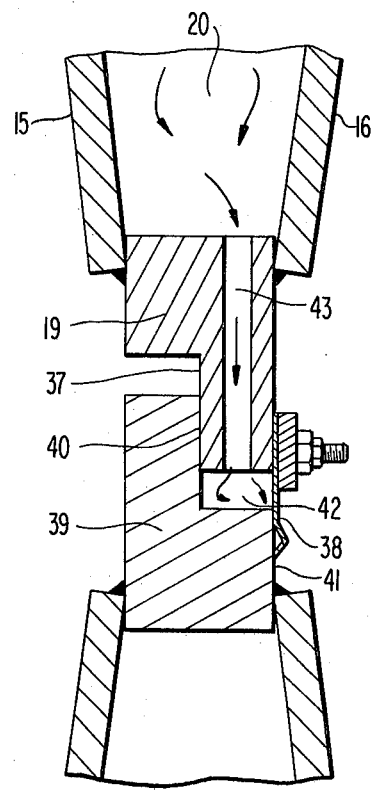
FIG. 5 is an enlarged fragmentary sectional view of the seating arrangement between the upper and lower blades in FIG. 1.
Figure 6:
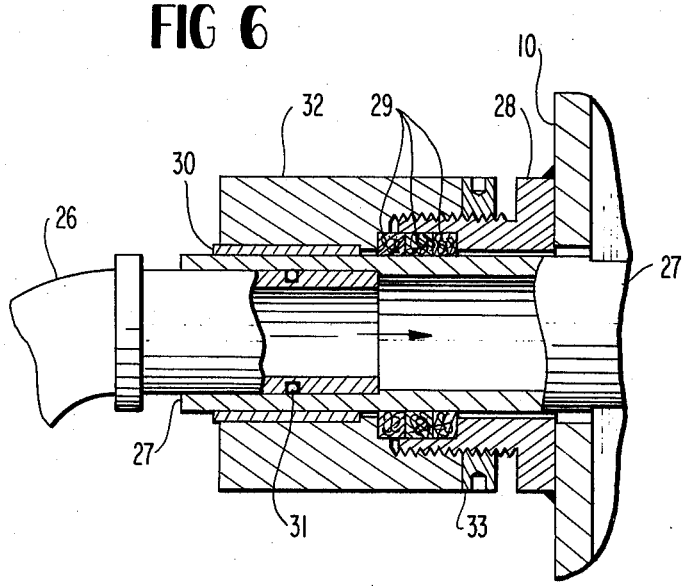
FIG. 6 is an enlarged sectional view of the base portion of the shaft of the upper blade.

Interior wall seat member 13 carries a flat seating area 36, against which the end of the protruding portion of leaf spring 22 urges, when blade 11 is in the valve closed position. As shown in FIGS. 2 and 4, when blade 11 is in the valve closed position there is formed an enclosed cavity 23 between the interface of flat, rigid surfaces 13 and 14 and the interface of leaf spring 22 and flat seating area 36. Enclosed cavity 23 is in air flow communication with internal chamber 20 by means of a series of spaced apart gas ports 24.

Pressurized air is supplied to internal chamber 20 of blade 11 from an external source (not shown) through entrance port 25, pipe 26, hollow shaft 27, and outlet holes 28.

Shaft 27 extends through frame 10 via externally threaded sleeve 28, which is welded to frame 10. Shaft 27 is rotatably held within sleeve 28 by bronze bearing 30. Sealing of the space between shaft 27 and sleeve 28 is provided by asbestos packing 29. Sealing of the space between shaft 27 and pipe 26 is effected by O-ring 31. Bearing 30 and packing 29 are held in place by bearing holder and packing nut 32, which is internally threaded to mate with sleeve 28. Bearing holder and packing nut 32 is held in the desired position by adjustable locking nut 33.

The opposite end of shaft 27 also extends through frame 10, where it is pivotally joined to linkage rod 34, which in turn is pivotally joined to drive shaft 35. Rotation of drive shaft 35 thus causes blades 11 and 12 to rotate in unison, in the same direction, between the valve open and valve closed positions.

When in the valve closed position, depicted in the attached drawings, pressurized air in internal chamber 20 of blade 11 passes through gas port 24 into enclosed cavity 23; the air pressure is maintained greater than the gas pressure on the upstream and downstream sides of blade 11, so that any leakage through gaps between leaf spring 22 and seating area 36, or between surface 14 and surface 21, will be of purge air, rather than conduit gases.

Since each louver blade in the valve assembly depicted in the attached drawings rotates about its longitudinal axis, half of its circumference carries seating members facing downstream, while the other half carries seating members which face upstream. With regard to blade 11, for example, the seating members (surface 21 and leaf spring 22) carried by its top edge portion 17 face downstream while the seating members (surface 37 and leaf spring 38) carried by its bottom edge portion 19 face upstream.

Bottom edge portion 19 of blade 11 seats against the top edge portion 39 of blade 12 in the same manner that top edge portion 17 seats against seat member 13. When the valve is in the closed position, flat, rigid surface 37 of edge portion 19 rests face-to-face against flat, rigid surface 40 of edge portion 39 to effect a seal. Spaced apart from the interface of surfaces 37 and 40 is leaf spring 38, carried by edge portion 19, which rests against seating area 41, carried by edge portion 39. Thus is formed an enclosed cavity 42, which is in communication with internal blade chamber 20 via gas ports 43 in edge portion 19.

Figure 7:
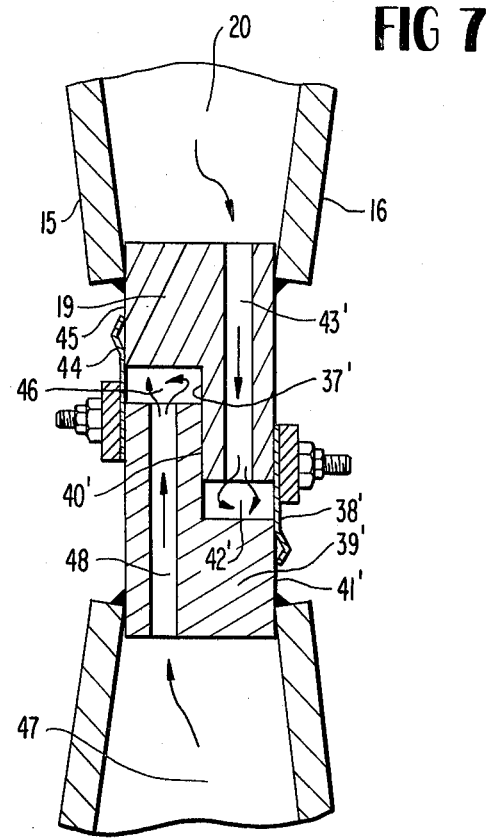
FIG. 7 is an enlarged fragmentary sectional view of an alternative seating arrangement that can be used between the upper and lower blades in FIG. 1.

FIG. 7 of the attached drawings shows an alternative arrangement for effecting the purged seal of the present invention between adjacent edge portions of valve blades 11 and 12; instead of one purge cavity between the edge portions, two such cavities are formed. Thus, edge portion 39' of lower blade 12 carries not only a seating area 41', but also carries a leaf spring 44 which rests against seating area 45 of edge portion 19 of blade 11 when the valve is closed. Purge cavity 42' spearates the interface between flat surfaces 37' and 40' and the interface between leaf spring 38' and 41', while purge cavity 46 separates the interface between flat surfaces 37' and 40' and the interface between leaf spring 44 and seating area 45. Purge cavity 42' is connected to internal chamber 20 of blade 11 via gas ports 43', while purge cavity 46 is connected to internal chamber 47 of blade 12 via gas ports 48. This use of two purge cavities between adjacent blades increases the effectiveness of the seal. It may be desired where the blade edges are relatively long, as in large dampers, or where the valve assembly is to be used in a high pressure application.

While certain novel features of the invention have been discussed herein and are pointed out in the following claims, it is to be understood that various omissions, substitutions, and changes may be made by those skilled in this art without departing from the essence of the invention.

It is claimed:

1. A valve assembly having a frame with a fluid flow opening therethrough; at least one blade mounted in the frame opening to be movable from a valve open position, in which fluid is able to flow through the frame opening, to a valve closed position, in which fluid is blocked from flowing through said frame opening, said blade having opposing upstream and downstream surfaces, an interior chamber lying between said surfaces, and edge portions joining said surfaces together; a first seat member carried by at least one of said edge portions, said first seat member including a substantially flat first rigid surface along its length and also a leaf spring along its length, the leaf spring being spaced apart from, and protruding beyond, the first rigid surface; a second seat member carried either by an interior wall of the frame or by the edge portion of an adjacent blade, said second seat member including a substantially flat second rigid surface along its length, and also a substantially flat seating area along its length, the seating area being spaced apart from the second rigid surface; said first and second seat members being so constructed and arranged that when the blade is in the valve closed position the flat, rigid surfaces rest face-to-face against each other and the end of the protruding portion of the leaf spring is urged against the seating area, blocking the flow of fluid around the blade and defining an enclosed cavity between the seat members, said cavity lying between said protruding portion of the leaf spring and said flat rigid surfaces and extending substantially the entire length of the seat members; and passageway means for carrying fluid under superatmospheric pressure, from a source external to said frame, through the interior chamber of said blade and into the enclosed cavity that is formed by the first and second seat members when the blade is in the valve closed position.

2. The valve assembly of claim 1 wherein the upstream and downstream surfaces of the blade are substantially elongated rectangles, the blade is rotatable from a valve open position to a valve closed position about a longitudinal axis lying between said upstream and downstream surfaces and substantially perpendicular to the direction of fluid flow through the frame opening, and said seat member-carrying edge portion of the blade is substantially parallel to said axis of rotation.

3. The valve assembly of claim 2 wherein the first and second seat members extend substantially the entire length of the edge portion of the blade.

4. The valve assembly of claim 2 wherein there is a plurality of said blades mounted side-by-side in the frame in such a manner that adjacent blades cooperate with one another to block fluid from flowing through said frame opening when the valve is in the closed position.

5. The valve assembly of claim 2 wherein each of said blades carries a said first seat member on at least one of said blade's edge portions.

6. The valve assembly of claim 5 wherein there is a sufficient number of said first and second seat members that said enclosed cavities substantially surround all of said blades when the valve is in the closed position.

7. The valve assembly of claim 1 wherein the first and second seat members extend substantially the entire length of the edge portion of the blade.

8. The valve assembly of claim 1 wherein the second seat member is carried by the frame.

9. The valve assembly of claim 8 wherein said flat, rigid surfaces are so formed that when the valve is in the closed position the plane of said flat, rigid surfaces is substantially perpendicular to the direction of fluid flow through the opening of the frame.

10. The valve assembly of claim 9 wherein the passageway means include a plurality of spaced apart gas ports along the length of said first seat member.

11. The valve assembly of claim 10 wherein there is a plurality of said blades mounted side-by-side in the frame in such a manner that adjacent blades cooperate with one another to block fluid from flowing through said frame opening when the valve is in the closed position.

12. The valve assembly of claim 11 wherein each of said blades carries a said first seat member on at least one of said blade's edge portions.

13. The valve assembly of claim 12 wherein there is a sufficient number of said first and second seat members that said enclosed cavities substantially surround all of said blades when the valve is in the closed position.

14. The valve assembly of claim 13 wherein adjacent edge portions of at least two adjacent blades each carry a said first seat member and a said second seat member so that two enclosed cavities are defined between the adjacent blades when the valve is in the closed position.

15. The valve assembly of claim 1 wherein said flat, rigid surfaces are so formed that when the valve is in the closed position the plane of said flat, rigid surfaces is substantially perpendicular to the direction of fluid flow through the opening of the frame.

16. The valve assembly of claim 1 wherein the passageway means include a plurality of spaced apart gas ports along the length of said first seat member.

17. The valve assembly of claim 1 wherein there is a plurality of said blades mounted side-by-side in the frame in such a manner that adjacent blades cooperate with one another to block fluid from flowing through said frame opening when the valve is in the closed position.

18. The valve assembly of claim 17 wherein each of said blades carries a said first seat member on at least one of said blade's edge portions.

19. The valve assembly of claim 17 wherein adjacent edge portions of at least two adjacent blades each carry a said first seat member and a said second seat member so that two enclosed cavities are defined between the adjacent blades when the valve is in the closed position.

* * * * *